No. 898,002.
PATENTED SEPT. 8, 1908.
W. F. PILLMORE & D. ANDEREGG.
CANNING APPARATUS.
APPLICATION FILED JULY 5, 1907.
2 SHEETS—SHEET 1.
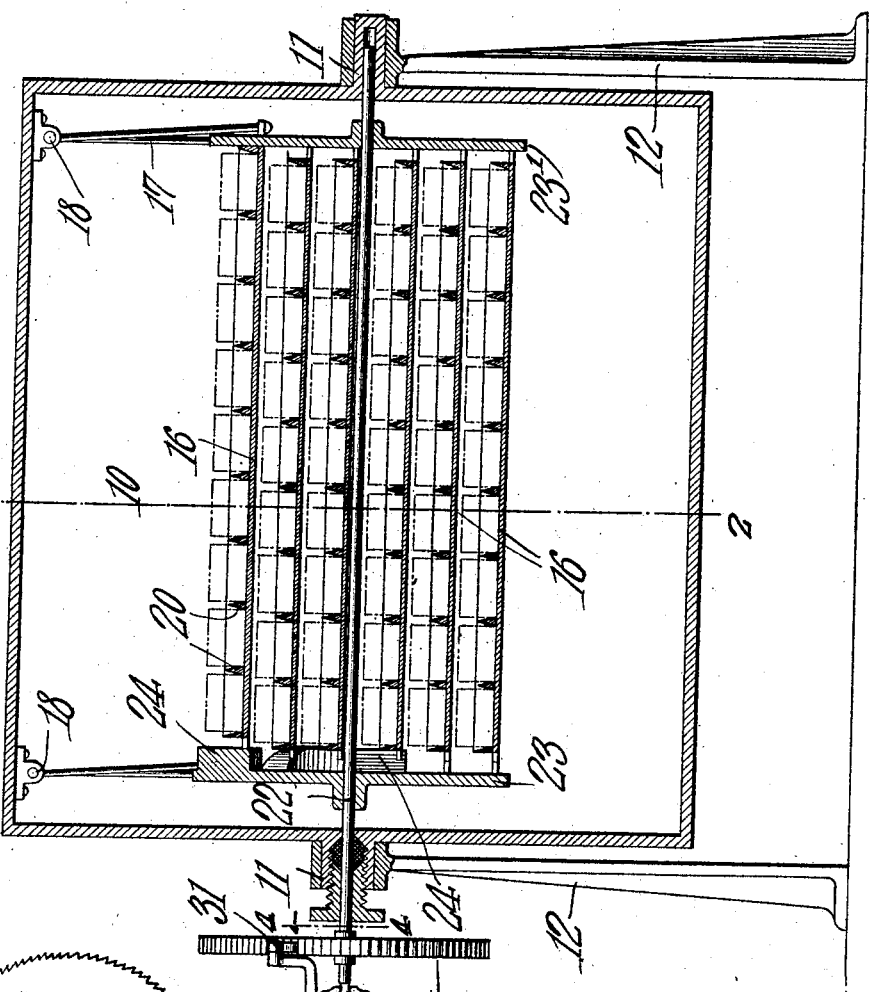
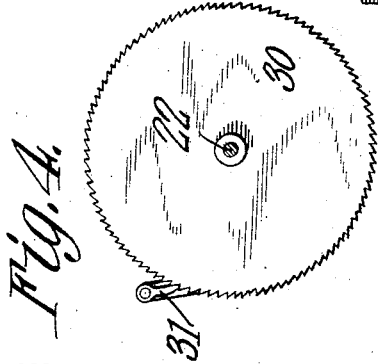
WITNESSES:
William F. Pillmore
David Anderegg
INVENTORS
By C. A. Snow & Co.
ATTORNEYS No. 898,002. PATENTED SEPT. 8, 1908.
W. F. PILLMORE & D. ANDEREGG.
CANNING APPARATUS.
APPLICATION FILED JULY 5, 1907.
2 SHEETS—SHEET 2.
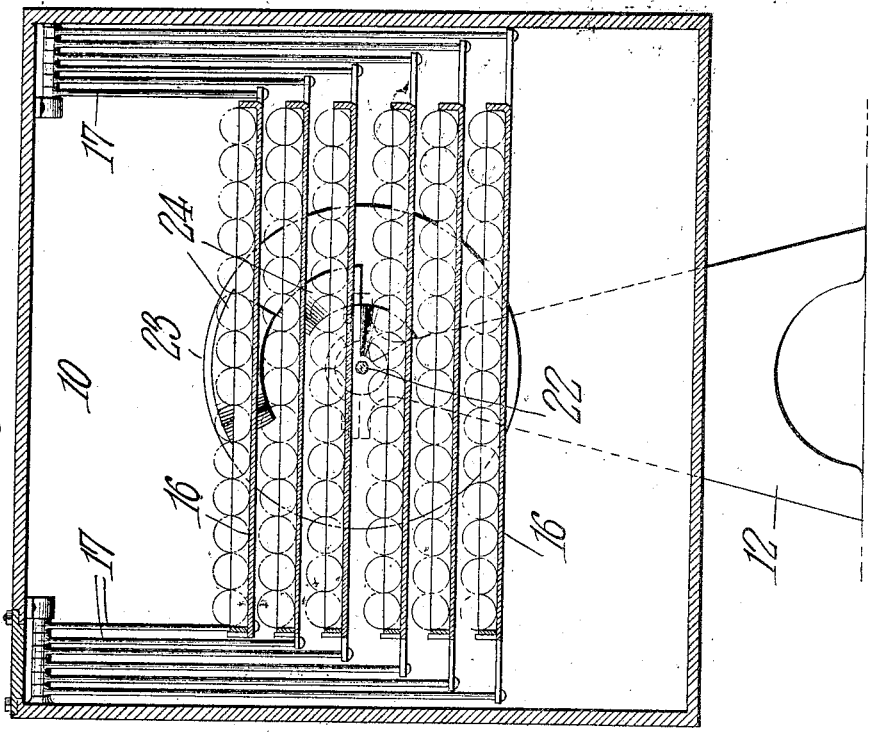
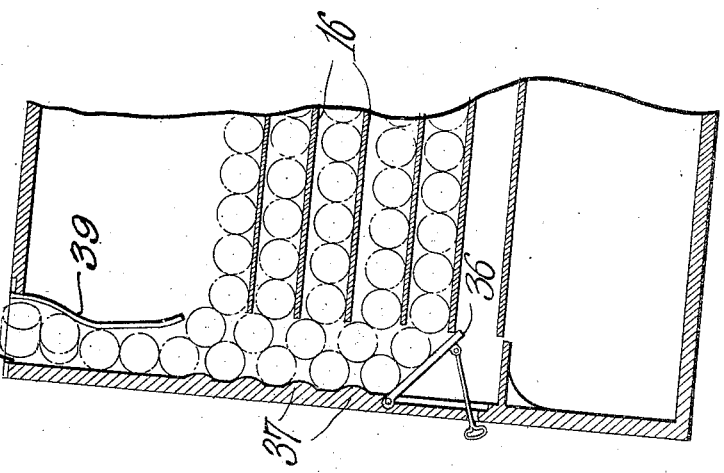
WITNESSES:
William F. Pillmore
David Anderegg INVENTORS
By
ATTORNEYS

UNITED STATES PATENT OFFICE.

WILLIAM F. PILLMORE AND DAVID ANDEREGG, OF WESTERNVILLE, NEW YORK.

CANNING APPARATUS.

No. 898,002.  Specification of Letters Patent.  Patented Sept. 8, 1908.

Application filed July 5, 1907. Serial No. 382,277.

*To all whom it may concern:*

Be it known that we, WILLIAM F. PILLMORE and DAVID ANDEREGG, citizens of the United States, residing at Westernville, in the county of Oneida and State of New York, have invented a new and useful Canning Apparatus, of which the following is a specification.

This invention relates to apparatus for processing canned goods, and has for its principal object to provide means for agitating the contents of the can in such manner that the entire contents may be subjected to the action of heat for practically the same period of time.

In the preparation of canned vegetables, taking corn for an example, it is usual after the cans are sealed to subject them to a temperature of about 250° Fahrenheit for a period of about sixty-five minutes. If the cans are allowed to remain stationary the corn which lies next to the tin is subjected to the high temperature for such a long period of time that the proteids are disintegrated and sulfur is set free. This sulfur unites with the hydrogen which is liberated by the action of the soldering flux on the metal, tin or lead in the solder and body of the cans. This forms sulfureted hydrogen $H_2S$ and the metallic salts held in solution in the can are precipitated so that the corn becomes discolored. Inasmuch as the corn is a poor conductor of heat the contents of the central portion of the can do not become heated until long after the operation is started and the cooking or sterilization is incomplete at the center, while at the outer edge the cooking process continues for a much greater length of time than is necessary and results in damage to the corn through loss of flavor and the discoloration mentioned.

The principal object of the invention is to provide means for thoroughly agitating the cans, so that the contents thereof will be exposed to uniform temperature throughout and for practically the same period of time, so that the cooking or sterilization may be made thorough and complete in a much shorter period of time than is possible under present conditions.

A further object of the invention is to provide a novel form of apparatus for agitating the cans.

A still further object of the invention is to provide a novel form of retort and means for quickly feeding the cans thereto and removing them therefrom.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a sectional elevation illustrating a retort and can agitating means constructed and arranged in accordance with the invention. Fig. 2 is a transverse sectional view of the same on the line 2—2 of Fig. 1. Fig. 3 is a sectional view of a portion of the structure, partly tilted, and showing the manner of removing the cans. Fig. 4 is a detail sectional view on the line 4—4 of Fig. 1.

Similar numerals of reference are employed to indicate corresponding parts throughout the several figures of the drawings.

The retort 10 is preferably of rectangular form and is carried by projecting end bearings 11 mounted in suitable standards 12 so that the retort may be tipped to an angular position for the purpose of facilitating loading and unloading.

Arranged witin the retort are a number of superposed shelves 16 which are hung by links 17 from carrying rods 18 arranged near the top of the retort, so that the shelves are free for slight swinging or longitudinal play. The shelves are each provided with vertically disposed partitions 20 spaced from each other, a distance slightly greater than the length of the cans, the partitions being of a height about equal to half the diameter of the can and being slightly tapered in thickness so that the ends of the cans may slightly bulge during the cooking operation.

Extending through the retort and its bearings is a shaft 22 which carries two disks 23 and 23' that are arranged at the ends of the shelves and the disk 23 is provided with a plurality of inwardly facing cams 24 arranged in stepped relation and disposed at different radial distances from the center of the shaft.

The cams engage the shelves in successive order, each cam pushing the shelf endwise until it engages against the disk 23' at the opposite end, so that the shelf is thus temporarily clamped between a cam at one end and a disk face at the opposite end.

One end of the shaft is connected to one end of a rod 26, the other end of which carries an eccentric strap 26' which surrounds an eccentric 27, and the eccentric moves the shaft in the direction of its length, this movement being transmitted to the disks 23 and 23', and thence to the shelves, so that the shelf clamped between the cams 24 of disk 23 and the plain disk 23' is moved to and fro, independent of the remaining shelves, so as to agitate the contents of the cans and expose all of the contents to the action of heat.

The shaft 22 has a swiveled connection with rod 26 which permits its free rotative movement without interfering with the longitudinal play, and on the shaft is secured a ratchet wheel 20 with which engages a pawl 31 carried by a lever 38 that is pivoted on a pin 42 on a stationary portion of the frame. The outer end of the lever is arranged to be engaged by a pin 32 that projects from the eccentric 27, and each time the latter is rotated, the lever will actuate the pawl and the latter will move the gear 30 to the extent of the throw of the pin 32, the step by step movement of the shaft causing the cams to engage the successive shelves and to remain in engagement therewith between the movements, although the shaft may be continuously revolved, if desired.

The sides of the shelves terminate short of one side of the retort, the distance between the sides of the shelves and the side wall of the retort being somewhat less than twice the diameter of a can, and the distance between superposed shelves being slightly greater than the diameter of the can. Pivoted to the side wall of the retort is a deflecting plate 36 which is normally placed in such position as to guide cans on to the shelf next to the lowermost. Above this deflecting plate is arranged a series of projections or cams 37 to assist in deflecting the cans on to the shelves.

At the top of the retort is a loading opening 38ª, and depending from one wall thereof is a can guide 39 which operates, in conjunction with the adjacent wall of the retort, to direct the cans to the interior of the retort and onto the shelves.

The loading operation is clearly shown in Fig. 3, where it will be seen that the cans gradually work down into the space between the sides of the shelf and the side walls of the retort and are deflected on to the first, second, third, fourth and fifth shelves, and after these shelves are filled, the number of cans used for deflecting purposes will be sufficient to fill the lowermost shelf, fourteen being shown in the present instance, the cans being deflected on to the lowermost shelf by lowering the plate 36 after the upper shelves have been filled.

In discharging the cans, the retort is tilted slightly in the opposite direction in order that the cans may roll out by gravity.

The steam or other fluid employed for heating purposes, the means for supplying which is not shown may be admitted in any suitable manner and automatic temperature controlling devices, also not shown may be employed for the purpose of maintaining a fixed temperature within the retort. The cans are thoroughly agitated, so that all portions thereof will be exposed to practically the same temperature for approximately the same period of time.

We claim:—

1. In apparatus of the class described, a normally free can support, and a pair of constantly movable shaking members between which said support is intermittently clamped.

2. In apparatus of the class described, a normally free can support, a constantly operated shaking means, and mechanism for intermittently connecting said support to said shaking means.

3. In combination, a can support, a shaking means therefor, and mechanism for alternately connecting and disconnecting the shaking means and support.

4. In combination, a can supporting shelf, a shaking means therefor, and means for connecting and disconnecting the shelf and shaking means at predetermined intervals.

5. In combination, a shelf for the support of cans, a pair of constantly operated shaking members, and means for moving said shaking members into clamping engagement with and disengagement from said shelf.

6. In combination, a plurality of can supporting shelves, a pair of revoluble shaking disks, cams disposed on one disk and serving by engagement with the shelf to clamp the latter between the two disks, and means for revolving said disks.

7. In apparatus of the class described, a plurality of superposed can supporting shelves, a longitudinally movable shaking shaft, a pair of disks arranged on the shaft at opposite ends of the shelf, cams carried by one of said disks and arranged to engage and clamp the shelves at intervals, and means for revolving said shaft.

8. In apparatus of the class described, a plurality of superposed shelves, a longitudinally movable shaking shaft, a pair of disks mounted on the shaft, one of said disks having shelf engaging cams, and means for imparting intermittent rotative movement to said shaft.

9. In apparatus of the class described a plurality of superposed shelves, a shaft, disks carried by the shaft, one of said disks having shelf engaging cams, means for reciprocating the shaft, and means for imparting a step by step rotative movement thereto.

10. In apparatus of the class described, a retort, a plurality of shelves suspended within the retort, a shaft extending through the end walls of the retort, a pair of disks carried by the shaft, one of said disks having shelf engaging cams, means for reciprocating the shaft, and means for imparting rotative movement to the shelf.

11. In apparatus of the class described, a tiltable retort having a plurality of superposed shelves and provided at the top with an entrance opening for the cans, all of the shelves being spaced from the loading side of the retort, and a movable deflector plate arranged to extend across the space from the loading side to the next to the lowermost shelf to thereby permit loading of all except the lowermost shelf, said deflector being adjustable to a position to bring its lower edge into alinement with the lowermost shelf, and the space at the loading side having the same capacity as the said lowermost shelf.

12. In apparatus of the class descibed, a can supporting shelf, and partitions dividing said shelf into can receiving spaces, said partitions being of a height approximately equal to half the diameter of the can and being tapered in thickness to permit bulging of the ends of the cans.

In testimony that we claim the foregoing as our own, we have hereto affixed our signatures in the presence of two witnesses.

WILLIAM F. PILLMORE.
DAVID ANDEREGG.

Witnesses:
L. R. PILLMORE,
R. A. JONES.